United States Patent
Lee et al.

(10) Patent No.: US 9,430,088 B1
(45) Date of Patent: Aug. 30, 2016

(54) TOUCH SENSOR DRIVING DEVICE AND DISPLAY DEVICE COMPRISING THE SAME

(71) Applicant: LG Display Co., Ltd., Seoul (KR)

(72) Inventors: Dukhyo Lee, Seoul (KR); Beomjin Kim, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 14/968,474

(22) Filed: Dec. 14, 2015

(30) Foreign Application Priority Data

Oct. 30, 2015 (KR) .......................... 10-2015-0151770

(51) Int. Cl.
  *G06F 3/045* (2006.01)
  *G06F 3/041* (2006.01)
  *G06F 3/044* (2006.01)

(52) U.S. Cl.
  CPC .............. *G06F 3/0416* (2013.01); *G06F 3/044* (2013.01); *G06F 3/0412* (2013.01)

(58) Field of Classification Search
  None
  See application file for complete search history.

(56) References Cited

U.S. PATENT DOCUMENTS

| | | | |
|---|---|---|---|
| 2009/0091552 A1* | 4/2009 | Lee | G06F 3/044 345/174 |
| 2013/0229224 A1* | 9/2013 | Ho | H03K 17/962 327/517 |
| 2014/0009432 A1* | 1/2014 | Kwon | G06F 3/0418 345/174 |
| 2014/0021966 A1* | 1/2014 | Shahrokhi | G01R 27/2605 324/679 |

FOREIGN PATENT DOCUMENTS

KR   10-2007-0032924   3/2007

OTHER PUBLICATIONS

Office Action for Korean Patent Application No. KR 10-2015-0151770, Jun. 30, 2016, 5 pages. (With Concise Explanation of Relevance).

* cited by examiner

*Primary Examiner* — Nicholas Lee
(74) *Attorney, Agent, or Firm* — Fenwick & West LLP

(57) ABSTRACT

A touch sensor driving device comprises: a plurality of touch sensing circuits that receive touch sensor sensing signals from touch sensors of a touchscreen through a plurality of receiving channels; and a plurality of discharge circuits connected between the receiving channels and the touch sensing circuits to receive charge eliminating pulse signals and reduce the swing amplitude of the touch sensor sensing signals input into the touch sensing circuits.

29 Claims, 14 Drawing Sheets

TOUCH SENSOR DRIVING DEVICE AND DISPLAY DEVICE COMPRISING THE SAME

This application claims the benefit of Republic of Korea Patent Application No. 10-2015-0151770, filed on Oct. 30, 2015, which is hereby incorporated by reference.

BACKGROUND

1. Field

This document relates to a touch sensor driving device and a display device comprising the same.

2. Related Art

User interfaces (UI) enable humans (users) to interact with various types of electric or electronic devices so that they can easily control the devices as they want. Typical examples of the user interfaces include keypads, keyboards, mice, on-screen displays (OSD), and remote controllers with an infrared communication capability or radio frequency (RF) communication capability. User interface technology is continuing to make progress toward higher user sensitivity and ease of operation. Recently, user interfaces have been evolving into touch UI, voice recognition UI, 3D UI, etc.

The touch UI has been iadopted in portable information appliances. The touch UI is implemented through a method for forming a touchscreen on the screen of a display device. Such a touchscreen can be implemented as a capacitive touchscreen. A touchscreen having capacitive touch sensors detects touch input by sensing a capacitance change, i.e., a change in the amount of charge in the touch sensors when a finger or conductive material comes into contact with the touch sensors.

The capacitive touch sensors can be implemented as self-capacitance sensors or mutual capacitance sensors. The electrodes of the self-capacitance sensors are connected to sensor lines oriented in one direction on a one-to-one basis. The mutual capacitance sensors are formed at the crossings of orthogonal sensor lines Tx and Rx with a dielectric layer interposed between them.

A touchscreen having capacitive sensors is connected to a plurality of touch sensing circuits. Each touch sensing circuit senses a change in the amount of charge in the touch sensors by receiving a touch sensor sensing signal from the touchscreen through a receiving channel. These touch sensing circuits may be integrated in a touch sensor driving device (integrated circuit) and connected to the sensor lines of the touchscreen.

An example of the touch sensing circuits is depicted in FIGS. 1 and 2. FIG. 1 illustrates a touch sensing circuit when a touchscreen TSP is implemented using mutual capacitance sensors Cm. FIG. 2 illustrates a touch sensing circuit when a touchscreen TSP is implemented using self-capacitance sensors Cs.

The touch sensing circuit of FIG. 1 may comprise an OP amp OP and a sensing capacitor Cf. An inverting input terminal (−) of the OP amp OP may be connected to a touch sensor Cm through a receiving channel, a non-inverting input terminal (+) of the OP amp OP may be connected to an input terminal of reference voltage Vref, and an output terminal of the OP amp OP may be connected to the inverting input terminal (−) via the sensing capacitor Cf.

In the touch sensing circuit of FIG. 1, the OP amp OP operates as an inverting amplifier. The touch sensing circuit's output voltage Vout may be represented as in Equation 1.

$$Vout = Vref - Vtx*(CM/CF) \quad \text{[Equation 1]}$$

where the reference voltage Vref is a DC level voltage, Vtx represents a touch driving voltage applied to the mutual capacitance sensor Cm, CM represents the mutual capacitance of the mutual capacitance sensor, and CF represents the capacitance of the sensing capacitor Cf. The output voltage Vout of FIG. 1 indicating a change in the amount of charge in the mutual capacitance sensors Cm has the opposite phase to that of the touch driving voltage Vtx.

The touch sensing circuit of FIG. 2 also may comprise an OP amp OP and a sensing capacitor Cf. An inverting input terminal (−) of the OP amp OP may be connected to a touch sensor Cs through a receiving channel, a non-inverting input terminal (+) of the OP amp OP may be connected to an input terminal of touch driving voltage Vm, and an output terminal of the OP amp OP may be connected to the inverting input terminal (−) via the sensing capacitor Cf.

In the touch sensing circuit of FIG. 2, the OP amp OP operates as a non-inverting amplifier. The touch sensing circuit's output voltage Vout may be represented as in Equation 2.

$$Vout = Vm + \Delta Vm*[1+(CS/CF)] \quad \text{[Equation 2]}$$

where Vm represents a touch driving voltage applied to the self-capacitance sensor Cs, ΔVm represents the amplitude of the touch driving voltage Vm, CS represents the self-capacitance of the self-capacitance sensor Cs, and CF represents the capacitance of the sensing capacitor Cf. The output voltage Vout of FIG. 2 indicating a change in the amount of charge in the self-capacitance sensors Cs has the same phase as the touch driving voltage Vm.

The permissible range of the output voltage Vout of a touch sensing circuit is determined in advance at the design stage, in consideration of the size of the touch sensor driving device. As display devices are getting larger, the size of the touchscreen TSP is growing and the mutual capacitance or self-capacitance of the touch sensors is also increasing. An increase in the capacitance CM or CS of the touch sensors leads to an increase in the absolute value of the output voltage Vout of the touch sensing circuit, as in Equations 1 and 2. In this case, the output voltage Vout of the touch sensing circuit may exceed a given permissible range and become saturated. Since the presence or absence of a touch is detected depending on how high the output voltage Vout of the touch sensing circuit is, it is impossible to tell whether there is a touch or not if the output voltage Vout exceeds the permissible range and becomes saturated.

SUMMARY

An aspect of this document is to provide a touch sensor driving device and method which prevent the output voltage of a touch sensing circuit from exceeding a given permissible range and becoming saturated, and a display device comprising the touch sensor driving device.

An exemplary embodiment of the present invention provides a touch sensor driving device, comprising: a plurality of touch sensing circuits that receive touch sensor sensing signals from touch sensors of a touchscreen through a plurality of receiving channels; and a plurality of discharge circuits connected between the receiving channels and the touch sensing circuits to reduce the swing amplitude of the touch sensor sensing signals input into the touch sensing circuits. The discharge circuits each comprise a plurality of charge eliminating capacitors connected in parallel to a first node, and the first node is selectively connected to an inverting input terminal and non-inverting input terminal of an OP amp included in each of the touch sensing circuits.

The electrodes at one side of the charge eliminating capacitors are connected commonly to the first node, and the electrodes at the other side of the charge eliminating capacitors are respectively connected to input terminals of charge eliminating pulse signals.

The charge eliminating pulse signals have the same phase and amplitude.

The charge eliminating pulse signals have the same phase, but at least some of the charge eliminating pulse signals have different amplitudes.

The discharge circuit further comprises: a first switch connected between the first node and the inverting input terminal of the OP amp; and a second switch connected between the first node and the non-inverting input terminal of the OP amp. The first and second switches are switched in opposite ways.

Each time a charge eliminating pulse signal falls from a high-potential level (3.3 V) to a low-potential level (0 V) within the width of one pulse of a touch sensor driving signal applied to the touch sensors, the first switch is turned on and the second switch is turned off, at a timing which is a predetermined length of time before the falling time.

The touch sensors are implemented as mutual capacitance sensors, and each of the charge eliminating pulse signals is generated in multiple pulses having the opposite polarity to that of the touch sensor driving signal applied to the mutual capacitance sensors, within the width of one pulse of the touch sensor driving signal, and applied multiple times to the electrodes at the other side of the charge eliminating capacitors.

The touch sensors are implemented as self-capacitance sensors, and each of the charge eliminating pulse signals is generated in multiple pulses having the same polarity as the touch sensor driving signal applied to the self-capacitance sensors, within the width of one pulse of the touch sensor driving signal, and applied multiple times to the electrodes at the other side of the charge eliminating capacitors.

Another exemplary embodiment of the present invention provides a display device comprising a display panel and a touch sensor driver for driving a touchscreen connected to the display panel. The touch sensor driver comprises: a plurality of touch sensing circuits that receive touch sensor sensing signals from touch sensors of a touchscreen through a plurality of receiving channels; and a plurality of discharge circuits connected between the receiving channels and the touch sensing circuits to receive charge eliminating pulse signals and reduce the swing amplitude of the touch sensor sensing signals input into the touch sensing circuits. The discharge circuits each comprise a plurality of charge eliminating capacitors connected in parallel to a first node, and the first node is selectively connected to an inverting input terminal and non-inverting input terminal of an OP amp included in each of the touch sensing circuits.

Yet another exemplary embodiment of the present invention provides a touch sensor driving method comprising: a plurality of touch sensing circuits' receiving touch sensor sensing signals input from touch sensors of a touchscreen through a plurality of receiving channels; and applying charge eliminating pulse signals to a plurality of discharge circuits connected between the receiving channels and the touch sensing circuits to reduce the swing amplitude of the touch sensor sensing signals input into the touch sensing circuits. The discharge circuits each comprise a plurality of charge eliminating capacitors connected in parallel to a first node, and the first node is selectively connected to an inverting input terminal and non-inverting input terminal of an OP amp included in each of the touch sensing circuits.

In one embodiment, a touch sensitive display device comprises at least one electrode. The display device comprises driver circuit that includes a touch sensor circuit and a discharge circuit. The touch sensor circuit comprises a first input terminal coupled to the at least one electrode. The discharge circuit is to discharge the first input terminal of the touch sensor circuit. The discharge circuit selectively connects the first input terminal to a discharge path a plurality of times at predetermined intervals during a touch driving pulse of a touch sensing driving signal provided to the at least one electrode.

In one embodiment, the predetermined intervals are periodic intervals. In one embodiment, the time periods during which the first input terminal is selectively connected to the discharge path is adjustable.

In one embodiment, the discharge path of the discharge circuit comprises a node and a plurality of charge eliminating capacitors coupled to the node. In one embodiment, the electrodes at one side of the charge eliminating capacitors are connected commonly to the node. Electrodes at another side of the charge eliminating capacitors are connected to respective charge eliminating pulse signals.

Each charge eliminating pulse signal has a plurality of pulses during the touch driving pulse of the touch driving signal.

In one embodiment, falling edges of the charge eliminating pulse signals occur while the first input terminal is connected to the discharge path. In one embodiment, the charge eliminating pulse signals comprise a first charge eliminating pulse signal and a second charge eliminating pulse signal having a same phase as the first charge eliminating pulse signal.

In one embodiment, the at least one electrode is implemented as a mutual capacitance sensor, and the pulses have opposite polarity from the touch driving pulse. In one embodiment, the at least one electrode is implemented as a self capacitance sensor, and the pulses have same polarity as the touch driving pulse.

In one embodiment, the discharging circuit comprises a first switch to selectively connect the first input terminal to the node the plurality of times. The touch sensor circuit further comprises a second input terminal, and the discharging circuit further comprises a second switch to selectively connect the second input terminal to the node a plurality of times during the touch driving pulse of the touch driving signal. The second switch is switched at an opposite phase from the first switch.

In one embodiment, the touch sensor circuit further comprises an op-amp. The first input terminal is a negative input terminal of the op-amp and the second input terminal is a positive input terminal of the op-amp.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION

Figure 1:
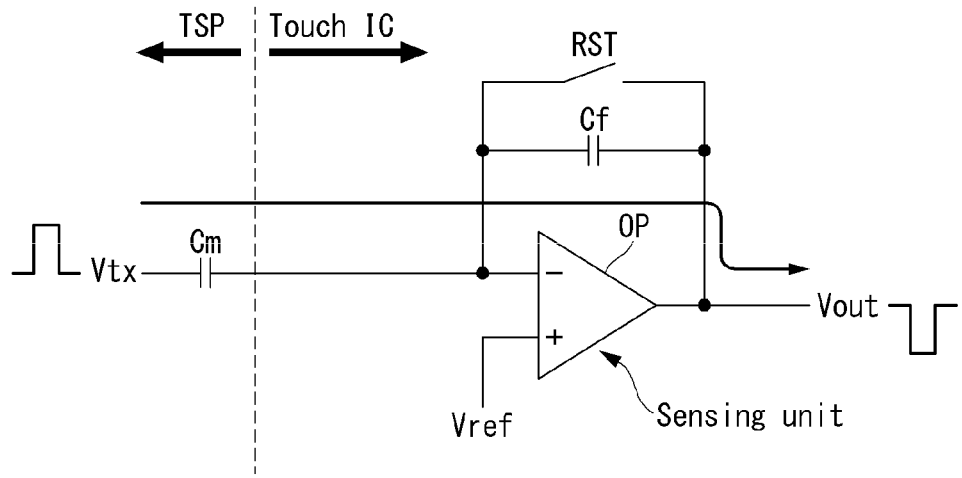
FIG. 1 is a view showing a conventional touch sensing circuit when a touchscreen is implemented using mutual capacitance sensors.
Figure 2:
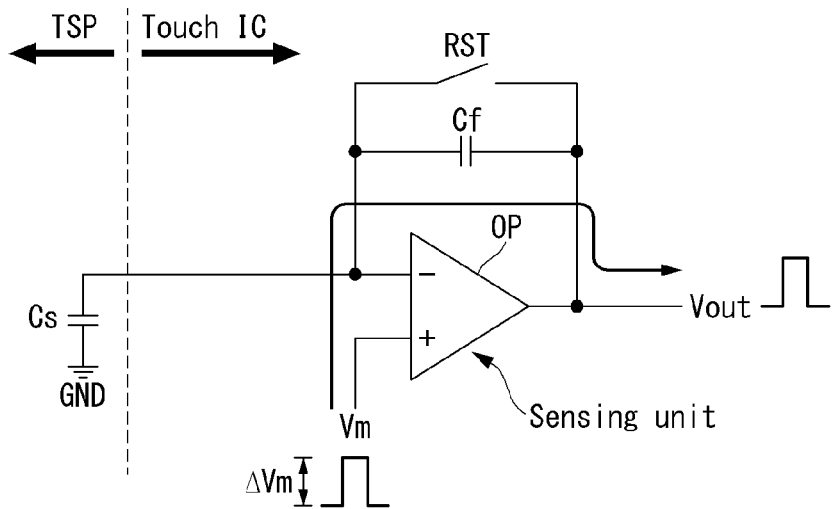
FIG. 2 is view showing a conventional touch sensing circuit when a touchscreen is implemented using self-capacitance sensors.

A display device with a touch sensor driving device integrated in it according to the present invention may be implemented as a flat panel display such as a liquid crystal display (LCD), a field emission display (FED), a plasma display panel (PDP), an organic light emitting display (OLED), or an electrophoresis display (EPD). Although the following exemplary embodiments will be described with respect to a liquid crystal display as an example of the flat plane display, it is to be noted that the display device of this invention is not limited to the liquid crystal display.

Hereinafter, exemplary embodiments of the present invention will be described in detail with reference to the accompanying drawings. Like reference numerals refer to like elements throughout the specification. In the following description, detailed descriptions of well-known functions or configurations will be omitted where they may unnecessarily obscure the subject matters of the invention.

Referring to FIGS. 3 to 7, a touch sensor driving device of this invention comprises a touchscreen TSP and a touch sensor driver 20.

The touchscreen TSP is implemented as a capacitive touchscreen. The capacitive touchscreen comprises a plurality of touch sensors. The touch sensors each comprise a capacitance. The capacitance may be classified into a self-capacitance and a mutual capacitance. The self-capacitance may be formed along a single layer of a conductor line oriented in one direction. The mutual capacitance may be formed between two conductor lines intersecting each other.

Figure 4:
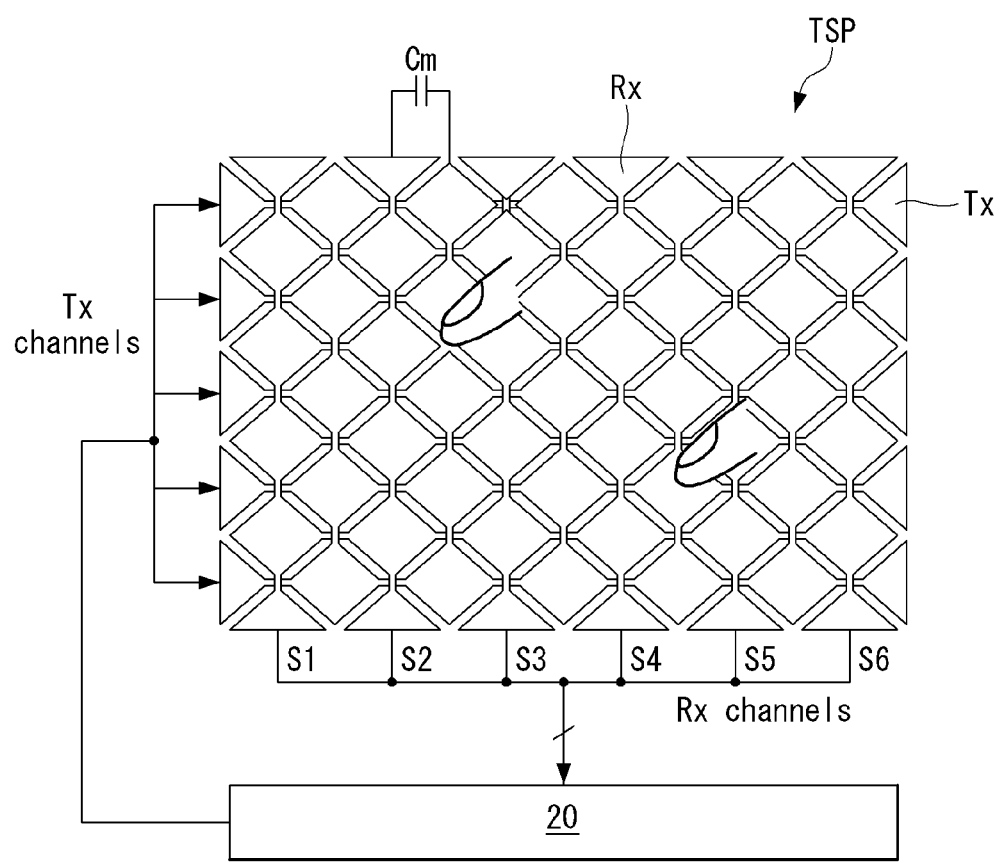
FIG. 4 is a view showing an example of the touchscreen implemented using mutual capacitance sensors.

As shown in FIG. 4, a touchscreen TSP implemented using mutual capacitance sensors Cm may comprise Tx lines, Rx lines intersecting the Tx lines, and touch sensors Cm formed at the crossings of the Tx lines and the Rx lines. The Tx lines are driving signal lines that apply a sensor driving pulse signal (hereinafter, touch sensor driving signal) to the touch sensors Cm and supply charge to the touch sensors Cm. The Rx lines are sensor lines that are connected to the touch sensors Cm and supply the charge in the touch sensors to the touch sensor driver 20. In a mutual capacitance sensing method, touch input can be sensed by applying a touch sensor driving signal to Tx electrodes through the Tx lines to supply charge to the mutual capacitance sensors Cm and sensing a capacitance change through the Rx electrodes and the Rx lines in synchronization with the touch sensor driving signal.

Figure 5:
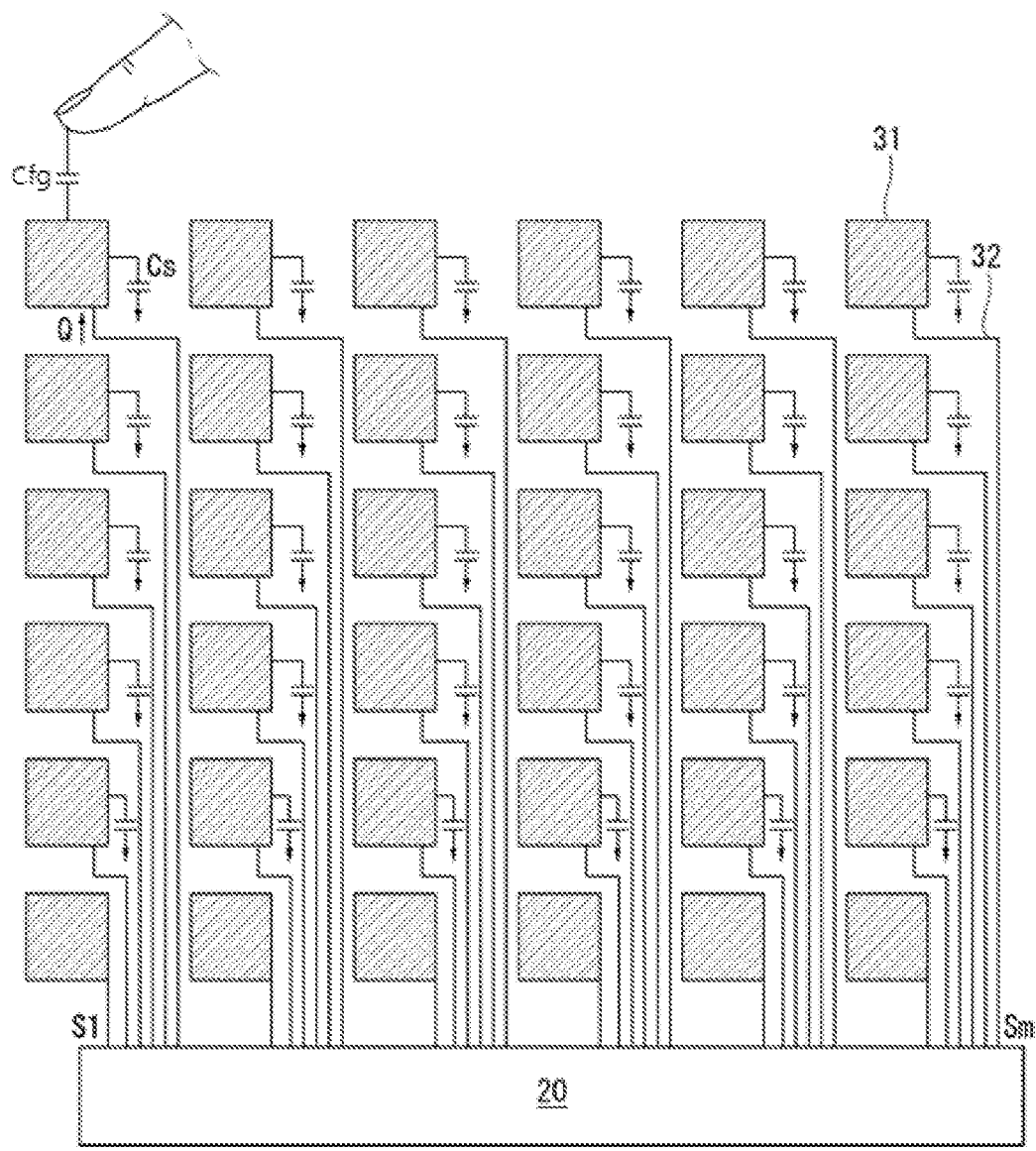
FIG. 5 is a view showing an example of the touchscreen implemented using self-capacitance sensors.

As shown in FIG. 5, in the case of a touchscreen TSP implemented using self-capacitance sensors Cs, touch electrodes 31 may be connected to sensor lines 32 oriented in one direction on a one-to-one basis. Each self-capacitance sensor Cs comprises a capacitance formed at each electrode 31. In a self-capacitance sensing method, when a driving signal is applied to a electrode 31 through a sensor line 32, charge Q is accumulated in the touch sensor Cs. In this instance, when a finger or a conductive material comes into contact with the electrode 31, a parasitic capacitance Cfg is additionally connected to the self-capacitance sensor Cs, causing a capacitance change. Accordingly, the presence or absence of a touch can be detected based on the difference in capacitance between the sensor touched by the finger and the other sensors.

Figure 6A:
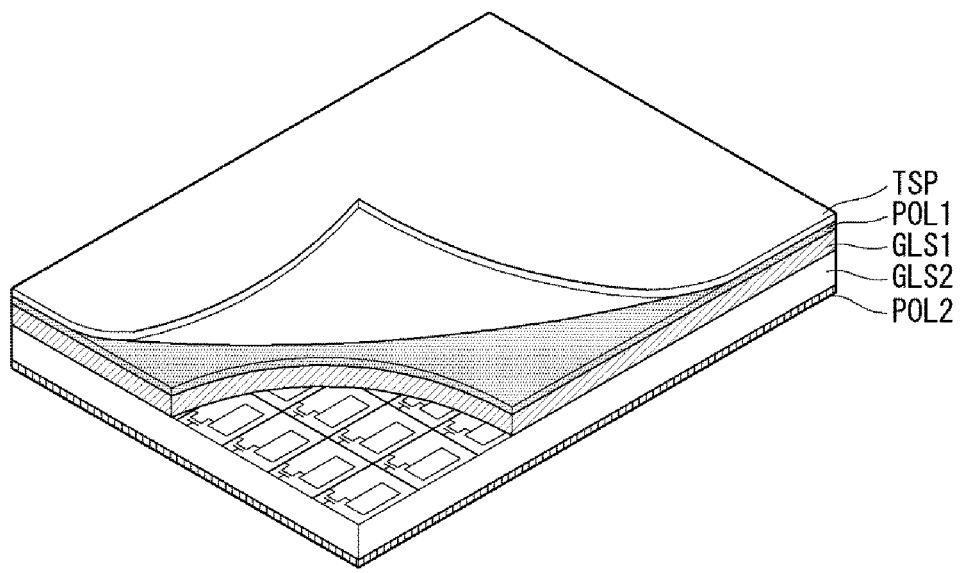
FIGS. 6A to 6C are views showing an example of a touchscreen being mounted on a display device.
Figure 6B:
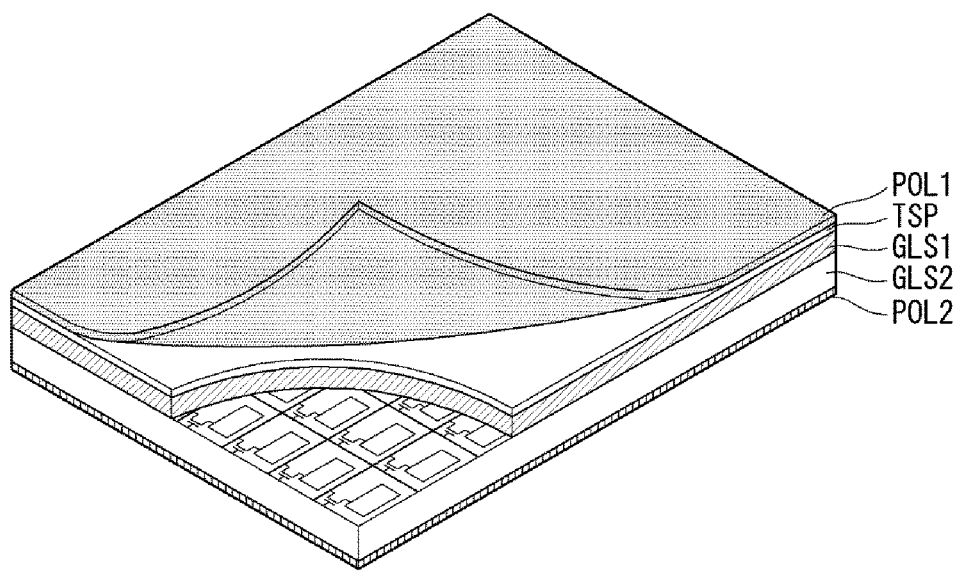
Figure 6C:
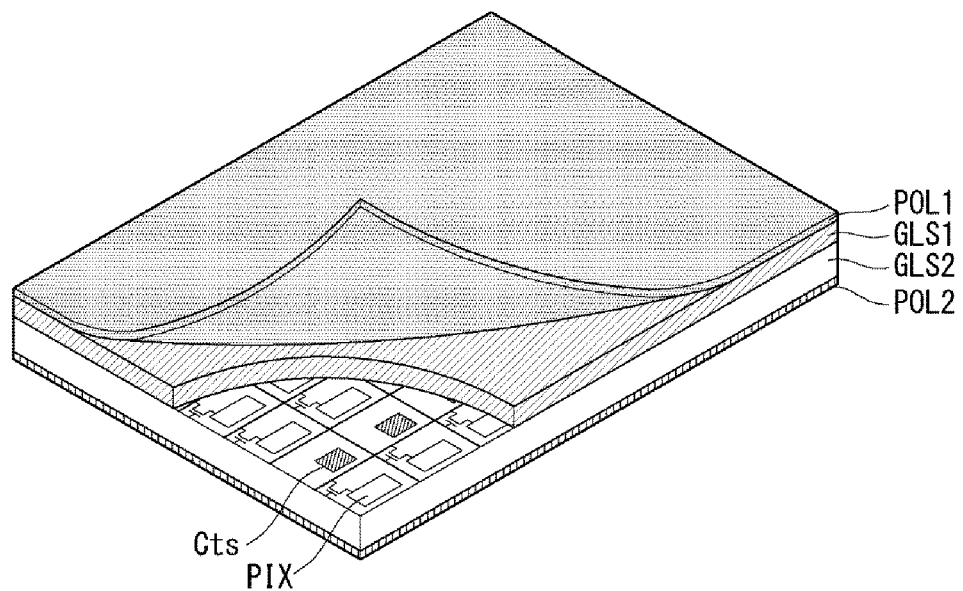

The touchscreen TSP may be bonded onto an upper polarizer POL1 of a display panel, as shown in FIG. 6A, or formed between the upper polarizer POL1 of the display panel and an upper substrate GLS1, as shown in FIG. 6B. Also, the touch sensors Cm or Cs of the touchscreen TP may be embedded in a pixel array of the display panel, as shown in FIG. 6C. In FIGS. 6A to 6C, "PIX" represents pixel electrodes of liquid crystal cells, "GLS2" represents a lower substrate, and "POL2" represents a lower polarizer.

The touch sensor driver 20 detects a touch with a finger or conductive material and the position of the touch by sensing a change in the amount of charge in the touch sensors between before and after the touch. The touch sensor driver may comprise a plurality of touch sensing circuits connected to receiving channels, and an analog-to-digital converter (hereinafter, ADC) for analog-to-digital converting the output voltage of the touch sensing circuits.

Each touch sensing circuit receives a touch sensor sensing signal from the touch sensors through multiple receiving channels, and senses touch input by using the received touch sensor sensing signal. The receiving channels may be connected to the Rx lines or the sensor lines 32 on a one-to-one basis. As shown in FIGS. 8 to 11, a touch sensing circuit may be implemented using a charge amplifier comprising an OP amp OP and a sensing capacitor Cf in order to receive a touch sensor sensing signal.

The touch sensors Cs or Cm are supplied with a touch sensor driving signal from the touch sensor driver 20. While the touch sensor driving signal may be generated in various forms such as a square wave pulse, a sine wave, a triangular wave, etc., it is preferably a square wave according to the present invention. The touch sensor driving signal may be applied N times to the touch sensors Cs or Cm so that charge is accumulated N times (N is a positive integer of 2 or more) in the charge amplifiers of the touch sensing circuits. The touch sensing circuits accumulate charge from the touch sensors Cs or Cm in the charge amplifiers and supply it to the ADC. The ADC converts the output voltage from the touch sensing circuits to a digital value.

Figure 7:
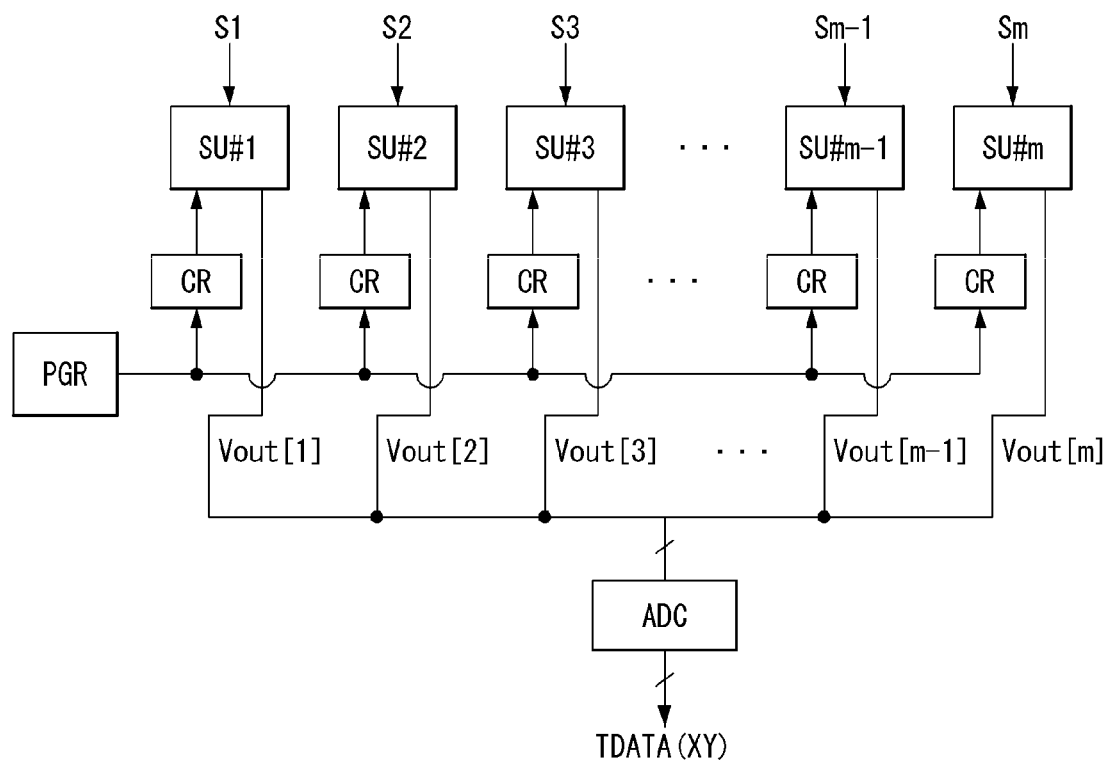
FIG. 7 is a view showing a touch sensor driving device comprising discharge circuits and a signal generator according to the present invention.

The touch sensor driver 20 may execute a touch sensor algorithm to compare the ADC-converted value with a preset threshold value, and if the ADC-converted value is larger than the threshold value, determines it to be a touch sensor sensing signal for a touch input position. As shown in FIG. 7, a touch report output from the touch sensor driver 20 may contain coordinate information TDATA(XY) of each touch input and transmit it to a host system 18.

To solve the problem of the output voltage of the touch sensing circuits SU on a large-sized touchscreen TSP exceeding a given output range for the touch sensing circuits and becoming saturated, the touch sensor driver 20 of this invention may comprise a plurality of discharge circuits CR and a signal generator PGR.

The signal generator PGR generates discharge control signals for controlling the output voltages Vout[1] to Vout[m] of the touch sensing circuits SU#1 to SU#m. The discharge control signals comprise a charge generation pulse signal (Vcr of FIGS. 8 to 11) to be described later and first and second switching control signals (signals for switching SW1 and SW2 of FIGS. 8 to 11) to be described later.

The discharge circuits CR are connected between the receiving channels S1 to Sm and the touch sensing circuits SU#1 to SU#m, and serve to reduce the swing amplitude of touch sensor sensing signals input into the touch sensing circuits SU#1 to SU#m. In the present invention, each of the discharge circuits CR may comprise two switches and a plurality of charge eliminating capacitors, in order to reduce the voltage swing amplitude of a charge eliminating pulse signal and the capacitance of the charge eliminating capacitors and to thereby reduce the size and manufacturing cost of the touch sensor driver 20. In the present invention, each of the discharge circuits CR may comprise two or more charge eliminating capacitors to vary the voltage swing amplitude of a charge eliminating pulse signal and the capacitance of the charge eliminating capacitors, thereby finely adjusting the swing amplitude of touch sensor sensing signals.

The specific configurations and operations of the discharge circuits CR and the touch sensing circuits SU#1 to SU#m will be described in detail with reference to FIGS. 8 to 11.

Referring back to FIG. 3, a display device employing a touch sensor driving device according to the present invention may comprise a display panel DIS, a display driving circuit 12, 14, and 16, and a host system 18.

The display panel DIS comprises a liquid crystal layer formed between two substrates. A pixel array of the display panel DIS comprises pixels that are formed in pixel regions defined by data lines D1 to Dm (m is a positive integer) and gate lines G1 to Gn (n is a positive integer). Each pixel comprises a TFT (thin film transistor) formed at the crossings of the data lines D1 to Dm and the gate lines G1 to Gn, a pixel electrode to be charged with a data voltage, a storage capacitor Cst connected to the pixel electrode to maintain the voltage of liquid crystal cells, and so on.

On the upper substrate of the display panel DIS, a black matrix, color filters, etc may be formed. The lower substrate of the display panel DIS may be implemented in a COT (color filter on TFT) structure. In this case, the black matrix and the color filters may be formed on the lower substrate of the display panel DIS. A common electrode to be supplied with a common voltage may be formed on the upper or lower substrate of the display panel DIS. Polarizers are respectively attached to the upper and lower substrates of the display panel DIS, and an alignment film for setting a pre-tilt angle of liquid crystals is formed on an inner surface contacting the liquid crystals. A column spacer for maintaining a liquid crystal cell gap is formed between the upper and lower substrates of the display panel DIS.

A backlight unit (not shown) may be disposed on the back of the display panel DIS. The backlight unit is an edge-type or direct-type backlight unit which illuminates the display panel DIS. The display panel DIS may be implemented in any well-known liquid crystal mode, such as a TN (Twisted Nematic) mode, a VA (Vertical Alignment) mode, an IPS (In-Plane Switching) mode, and an FFS (Fringe Field Switching) mode.

The display driving circuit comprises a data drive circuit 12, a scan drive circuit 14, and a timing controller 16, and writes video data of an input image to the pixels of the display panel DIS. The data drive circuit 12 converts digital video data RGB input from the timing controller 16 to an analog positive/negative gamma compensation voltage to output a data voltage. The data voltage output from the data drive circuit 12 is supplied to the data lines D1 to Dm. The scan drive circuit 14 sequentially supplies a gate pulse (or scan pulse) synchronized with the data voltage to the gate lines G1 to Gn to select pixel lines of the display panel DIS to which the data voltage is written.

The timing controller 16 receives timing signals such as a vertical synchronization signal Vsync, horizontal synchronization signal Hsync, data enable signal DE, main clock MCLK, etc input from the host system 18, and synchronizes the operation timings of the data drive circuit 12 and scan drive circuit 14. Scan timing control signals include a gate start pulse (GSP), a gate shift clock, a gate output enable (GOE) signal, etc. Data timing control signals include a source sampling clock SSC, a polarity control signal POL, a source output enable signal SOE, etc.

The host system 18 may be implemented as any one of the following: a television system, a set-top box, a navigation system, a DVD player, a Blue-ray player, a personal computer PC, a home theater system, and a phone system. The host system 18 comprises a system-on-chip (SoC) having a scaler incorporated therein, and converts digital video data RGB of an input image into a format suitable for display on the display panel DIS. The host system 18 transmits the timing signals Vsync, Hsync, DE, and MCLK, along with the digital video data, to the timing controller 16. Further, the host system 18 executes an application associated with coordinate information XY for a touch report input from the touch sensor driver 20.

Figure 8:
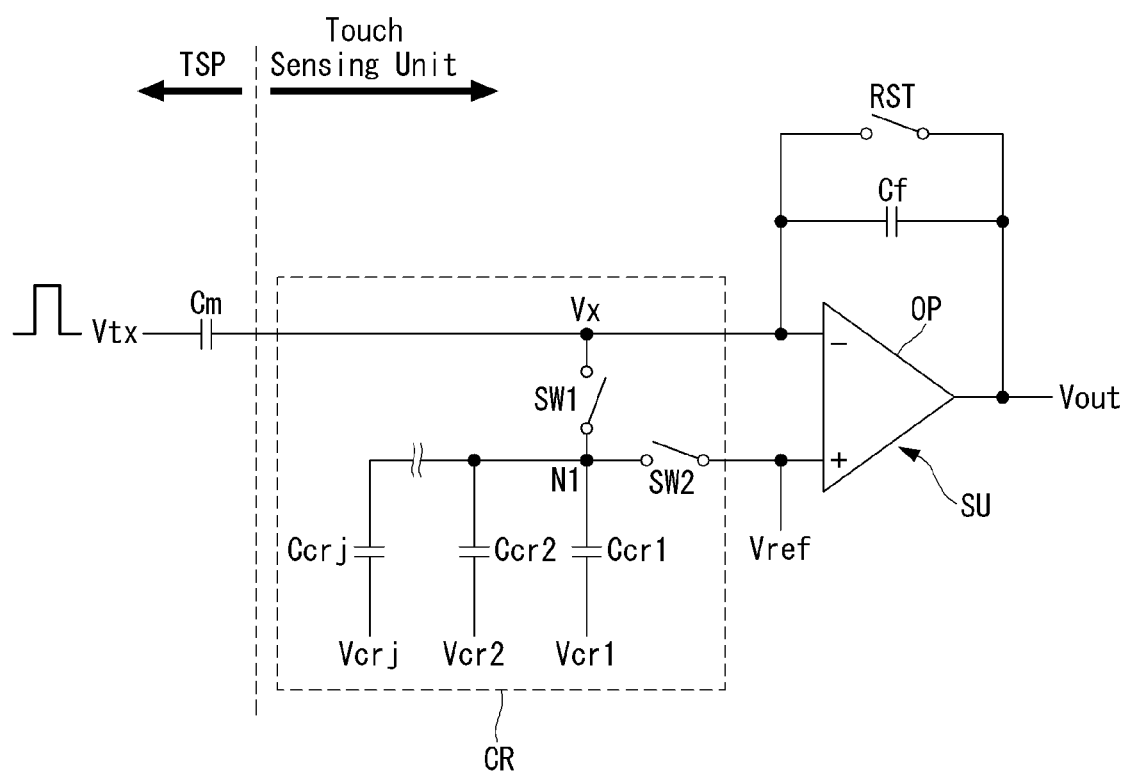
FIG. 8 is a view showing the configuration of a touch sensing circuit employing a discharge circuit according to one exemplary embodiment of the present invention.
Figure 9:
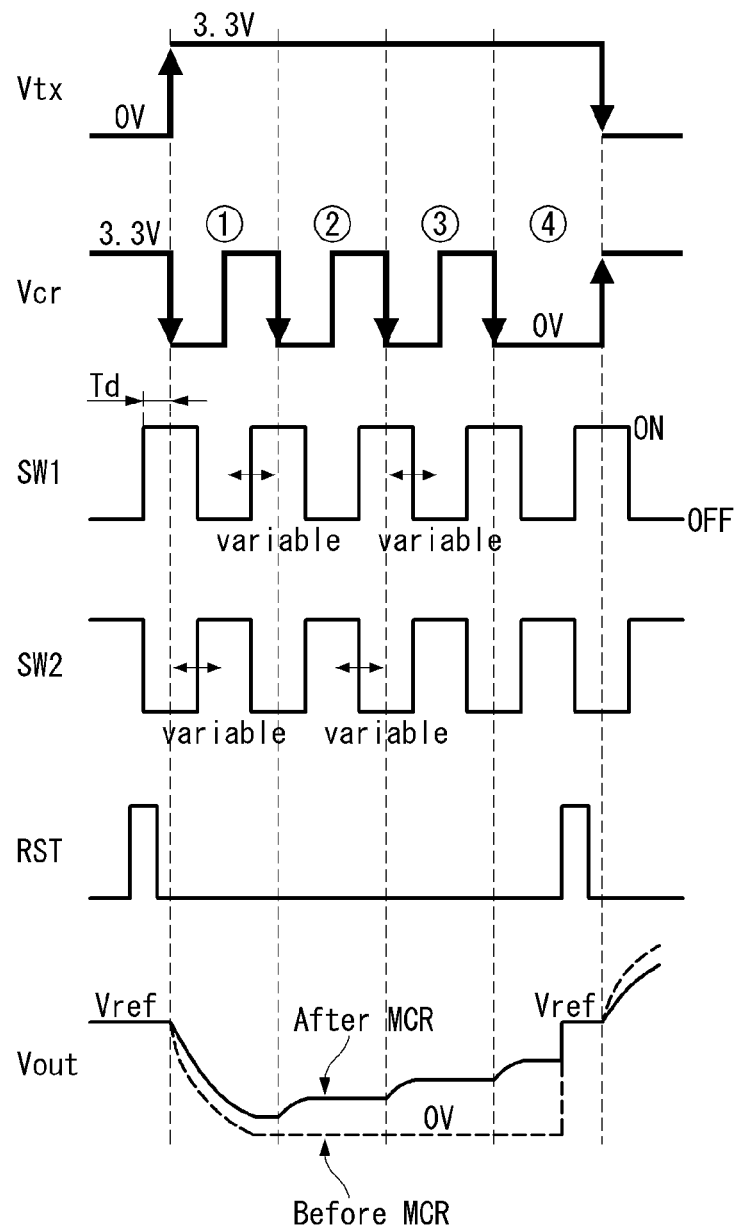
FIG. 9 shows the operation timing of FIG. 8 and the waveform of the resultant output voltage.

FIG. 8 illustrates the configuration of a touch sensing circuit SU employing a discharge circuit CR according to one exemplary embodiment of the present invention. FIG. 9 shows the operation timing of FIG. 8 and the waveform of the resultant output voltage Vout.

When the touchscreen TSP is implemented using mutual capacitance sensors Cm, the touch sensing circuit SU may comprise an OP amp OP and a sensing capacitor Cf as shown in FIG. 8. An inverting input terminal (−) of the OP amp OP may be connected to a mutual capacitance sensor Cm through a receiving channel. A non-inverting input terminal (+) of the OP amp OP may be connected to an input terminal of reference voltage Vref. An output terminal of the OP amp OP may be connected to the inverting input terminal (−) via the sensing capacitor Cf. The sensing capacitor Cf has the function of integrating a touch sensor sensing signal Vx input through the inverting input terminal (−). A reset switch RST of the touch sensing circuit SU performs the function of resetting the sensing capacitor Cf on a certain cycle.

The discharge circuit CR partially discharges the inverting input terminal (−), thereby reducing the charge at the inverting input terminal (−) and decreasing the voltage amplitude of the touch sensor sensing signal Vx. The discharge circuit CR may also be referred to as a charge reducing circuit. The discharge circuit CR includes a charge discharge path comprised of a plurality of charge eliminating capacitors Ccr1 to Ccrj connected in parallel to a first node N1. The electrodes at one side of the charge eliminating capacitors Ccr1 to Ccrj are connected commonly to the first node N1, and the electrodes at the other side of the charge eliminating capacitors Ccr1 to Ccrj are connected respectively to input terminals of charge eliminating pulse signals Vcr1 to Vcrj. The charge eliminating pulse signals Vcr1 to Vcrj may have the same phase and amplitude. The charge eliminating pulse signals Vcr1 to Vcrj have the same phase, but at least some of them may have different amplitudes so that the swing amplitude of the touch sensor sensing signals Vx are more finely adjusted.

The discharge circuit CR further comprises a first switch SW1 connected between the electrodes at one side of the charge eliminating capacitors Ccr1 to Ccrj and the inverting input terminal (−) of the OP amp OP, and a second switch SW2 connected between the electrodes at one side of the charge eliminating capacitors Ccr1 to Ccrj and the non-inverting input terminal (+) of the OP amp OP. The first and second switches SW1 and SW2 are selectively switched in opposite ways in response to a switching control signal (not shown).

The switching control signal may be generated with reference to the charge eliminating pulse signals Vcr1 to Vcrj. The on-duty time of the switching control signal may be varied into a proper value depending on the model and specification of the display device. To reduce the swing amplitude of the touch sensor sensing signals Vx, each of the charge eliminating pulse signals Vcr1 to Vcrj may be generated with multiple charge eliminating pulses have the opposite polarity to that of a touch driving pulse of a touch sensor driving signal Vtx applied to the mutual capacitance sensors Cm, within the width of one touch driving pulse of the touch sensor driving signal Vtx, as shown in FIG. 9, and may be applied multiple times at predetermined periodic intervals to the electrodes at the other side of the charge eliminating capacitors Ccr1 to Ccrj. This increase in the number of times of application can reduce the size and manufacturing cost of the touch sensor driver 20.

As shown in FIG. 9, during a single touch driving pulse of the touch driving signal Vm, switch SW1 and switch SW2 are turned on and off multiple times at predetermined periodic intervals. The duty cycle of the switches SW1 and SW2 can be variable such that the on times and off time periods of the switches SW1 and SW2 are adjustable. Additionally, charge eliminating pulse signal Vcr includes multiple charge eliminating pulses at predetermined periodic intervals. Each time a charge eliminating pulse signal Vcr falls from a high-potential level (3.3 V) to a low-potential level (0 V) within the width of one pulse of the touch sensor driving signal Vtx, the first switch SW1 may be turned on and at the same time the second switch SW2 may be turned off, at a timing which is a predetermined length of time Td before the falling time of the charge eliminating pulse signal Vcr.

The first switch SW1 is turned on before the charge eliminating pulse signal Vcr has a falling edge, so as to ensure operational stability. The second switch SW2 is turned on while the first switch SW1 is off, so as to stabilize the potential of the electrodes at one side of the charge eliminating capacitors Ccr at a given value Vref. The charge eliminating pulse signal Vcr falls while the first switch SW1 is on and is connecting the negative input terminal (−) to node N1 of the discharge path. The more times the charge eliminating pulse signal Vcr falls, the more the cumulative number of times the output voltage Vout is adjusted. Accordingly, the present invention efficiently prevents saturation of the output voltage Vout, merely by means of a charge eliminating pulse signal Vcr having a narrow voltage swing amplitude and a charge eliminating capacitor having a small capacitance.

Also, the charge eliminating pulse signal Vcr has rising edges while the switch SW1 is off. However, the rising edges do not affect the voltage at the negative input terminal (−) because the negative input terminal (−) is disconnected from node N1 during these rising edges.

In the touch sensing circuit SU of FIGS. 8 and 9, the OP amp OP functions as an inverting amplifier. The output voltage Vout of the touch sensing circuit SU may be represented as in Equation 3 because of the discharge circuit CR.

$$Vout = Vref - Vtx*(CM/CF) - [\{n*Vcr1*(CCR1/CF)\} + \{n*Vcr2*(CCR2/CF)\} + \ldots + \{n*Vcrj*(CCRj/CF)\}] \quad \text{[Equation 3]}$$

where the reference voltage Vref is a DC level voltage, Vtx represents voltage of a touch sensor driving signal applied to the mutual capacitance sensor Cm, CM represents the mutual capacitance of the mutual capacitance sensor, CF represents the capacitance of the sensing capacitor Cf, and CCR1-CCRj represent the capacitance of the charge eliminating capacitors Ccr1-Ccrj, Vcr1-Vcrj represent voltages of charge eliminating pulse signals applied to the charge eliminating capacitors Ccr1-Ccrj, and n represents the number of times the charge eliminating pulses are applied.

In Equation 3, the output voltage Vout of the touch sensing circuit SU exists within a predetermined permissible range of output voltage Vout due to the use of the discharge circuit CR. This efficiently solves the problem of saturation of output of the touch sensing circuit SU, particularly with the advantage of reducing the size of the touch sensor driving device by repeating a charge eliminating operation n times. Furthermore, the swing amplitude of touch sensor sensing signals can be finely adjusted by varying the voltage swing amplitude of a charge eliminating pulse signal and the capacitance of the charge eliminating capacitors. The present invention allows for efficient correction of sensitivity differences between sensing channels by finely adjusting the swing amplitude of touch sensor sensing signals.

Additionally, in FIG. 9, the term "MCR" refers to the charge eliminating operation.

Figure 10:
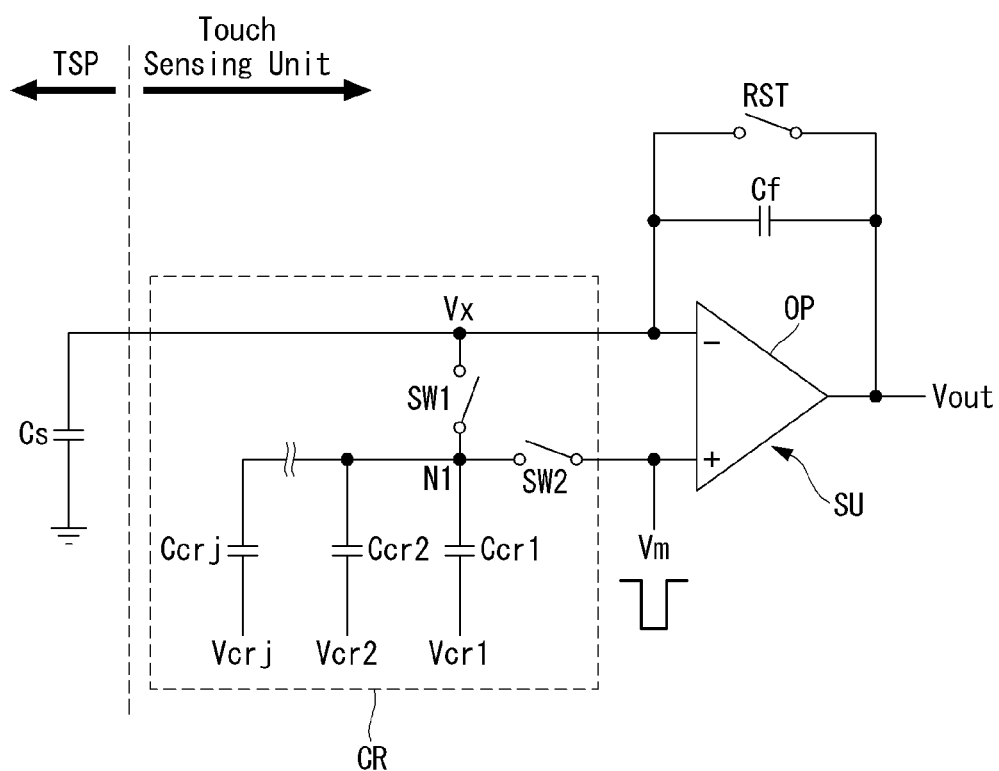
FIG. 10 illustrates the configuration of a touch sensing circuit employing a discharge circuit according to another exemplary embodiment of the present invention.
Figure 11:
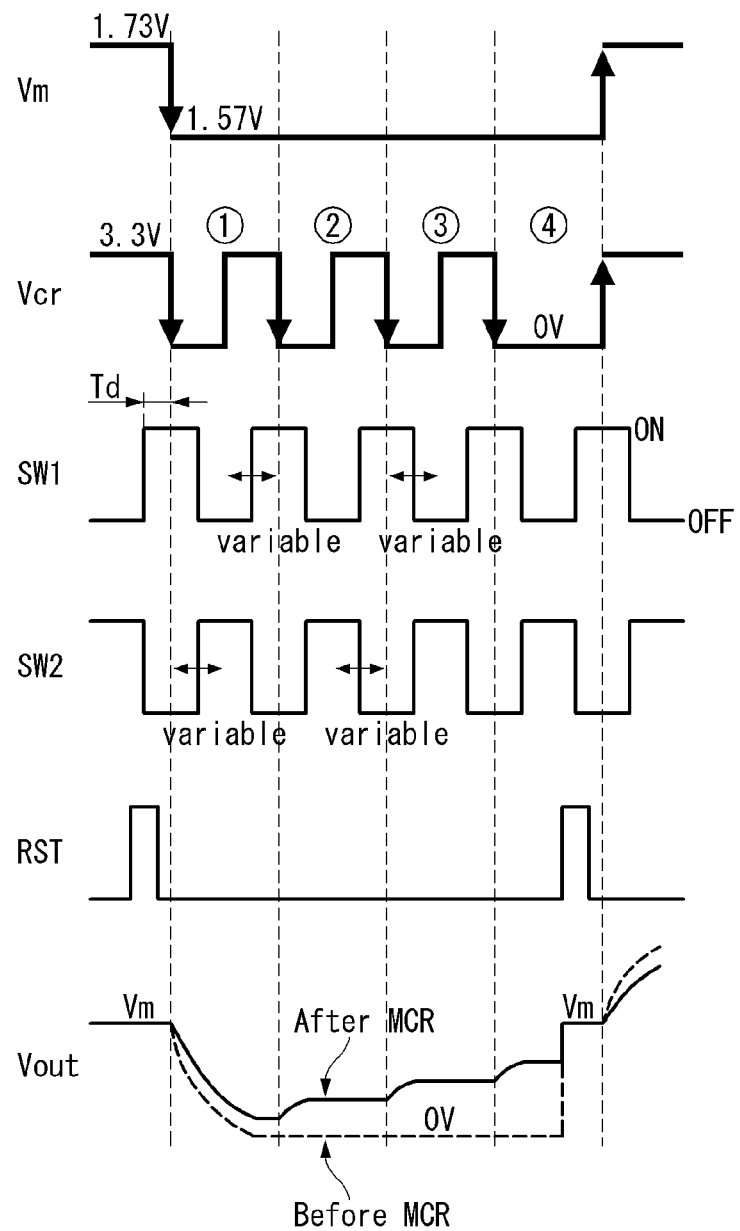
FIG. 11 illustrates the operation timing of FIG. 10 and the waveform of the resultant output voltage.

FIG. 10 illustrates the configuration of a touch sensing circuit employing a discharge circuit according to another exemplary embodiment of the present invention. FIG. 11 illustrates the operation timing of FIG. 10 and the waveform of the resultant output voltage.

When the touchscreen TSP is implemented using self-capacitance sensors Cs, the touch sensing circuit SU may comprise an OP amp OP and a sensing capacitor Cf as shown in FIG. 10. An inverting input terminal (−) of the OP amp OP may be connected to a self-capacitance sensor Cs through a receiving channel, a non-inverting input terminal (+) of the OP amp OP may be connected to an input terminal of touch sensor driving signal Vm, and an output terminal of the OP amp OP may be connected to the inverting input terminal (−) via the sensing capacitor Cf. The sensing capacitor Cf has the function of integrating a touch sensor sensing signal Vx input through the inverting input terminal (−). A reset switch RST of the touch sensing circuit SU performs the function of resetting the sensing capacitor Cf on a certain cycle.

The discharge circuit CR comprises a plurality of charge eliminating capacitors Ccr1 to Ccrj connected to a first node N1 in parallel. The electrodes at one side of the charge eliminating capacitors Ccr1 to Ccrj are connected commonly to the first node N1, and the electrodes at the other side of the charge eliminating capacitors Ccr1 to Ccrj are connected respectively to input terminals of charge eliminating pulse signals Vcr1 to Vcrj. The charge eliminating pulse signals Vcr1 to Vcrj may have the same phase and amplitude. At least some of the charge eliminating pulse signals Vcr1 to Vcrj may have different amplitudes so that the swing amplitude of the touch sensor sensing signals are more finely adjusted.

The discharge circuit CR further comprises a first switch SW1 connected between the electrodes at one side of the charge eliminating capacitors Ccr1 to Ccrj and the inverting input terminal (−) of the OP amp OP, and a second switch SW2 connected between the electrodes at one side of the charge eliminating capacitors Ccr1 to Ccrj and the non-inverting input terminal (+) of the OP amp OP. The first and second switches SW1 and SW2 are switched in opposite ways in response to a switching control signal (not shown).

The switching control signal may be generated with reference to the charge eliminating pulse signals Vcr1 to Vcrj. The on-duty time of the switching control signal may be varied into a proper value depending on the model and specification of the display device. To reduce the swing amplitude of the touch sensor sensing signals Vx, each of the charge eliminating pulse signals Vcr1 to Vcrj may be generated in multiple pulses having the same polarity as a touch driving pulse of touch sensor driving signal Vm applied to the self-capacitance sensors Cs, within the width of one pulse of the touch sensor driving signal Vm, as shown in FIG. 11, and may be applied multiple times to the electrodes at the other side of the charge eliminating capacitors Ccr1 to Ccrj. This increase in the number of times of application can reduce the size and manufacturing cost of the touch sensor driver 20.

As shown in FIG. 11, each time a charge eliminating pulse signal Vcr falls from a high-potential level (3.3 V) to a low-potential level (0 V) within the width of one pulse of the touch sensor driving signal Vm, the first switch SW1 may be turned on and at the same time the second switch SW2 may be turned off, at a timing which is a predetermined length of time Td before the falling time. The first switch SW1 is turned on before the charge eliminating pulse signal Vcr falls, so as to ensure operation stability. The second switch SW2 is turned on while the first switch SW1 is off, so as to stabilize the potential of the electrodes at one side of the charge eliminating capacitors Ccr at a given value (1.57 V) before sampling. The charge eliminating pulse signal Vcr falls while the first switch SW1 is on, and the more times the charge eliminating pulse signal Vcr falls, the more the cumulative number of times the output voltage Vout is adjusted. Accordingly, the present invention efficiently prevents saturation of the output voltage Vout, merely by means of a charge eliminating pulse signal Vcr having a narrow voltage swing amplitude and a charge eliminating capacitor having a small capacitance.

In the touch sensing circuit SU of FIGS. 10 and 11, the OP amp OP functions as an inverting amplifier. The output voltage Vout of the touch sensing circuit SU may be represented as in Equation 4 because of the discharge circuit CR.

$$V_{out}=Vm+\Delta Vm*[1+\{(CS+CCR)/CF\}]-[\{n*Vcr1*(CCR1/CF)\}+\{n*Vcr2*(CCR2/CF)\}+\ldots +\{n*Vcrj*(CCRj/CF)\}]$$ [Equation 4]

where Vm represents a voltage of a touch sensor driving signal applied to the self-capacitance sensor Cs, ΔVm represents the swing amplitude of the touch sensor driving signal Vm, CS represents the self-capacitance of the self-capacitance sensor Cs, CF represents the capacitance of the charge eliminating capacitors Ccr1 to Ccrj, CCR1-CCRj represent the capacitance of the charge eliminating capacitors Ccr1-Ccrj, Vcr1-Vcrj represent voltages of charge eliminating pulse signals applied to the charge eliminating capacitors Ccr1-Ccrj, and n represents the number of applications.

In Equation 4, the output voltage Vout of the touch sensing circuit SU exists within a predetermined permissible range of the output voltage Vout due to the use of the discharge circuit CR. This efficiently solves the problem of saturation of output of the touch sensing circuit SU, particularly with the advantage of reducing the size of the touch sensor driving device by repeating a charge eliminating operation n times. Furthermore, the swing amplitude of touch sensor sensing signals Vx can be finely adjusted by varying the voltage swing amplitude of a charge eliminating pulse signal and the capacitance of the charge eliminating capacitors. The present invention allows for efficient correction of sensitivity differences between sensing channels by finely adjusting the swing amplitude of touch sensor sensing signals.

Figure 12:
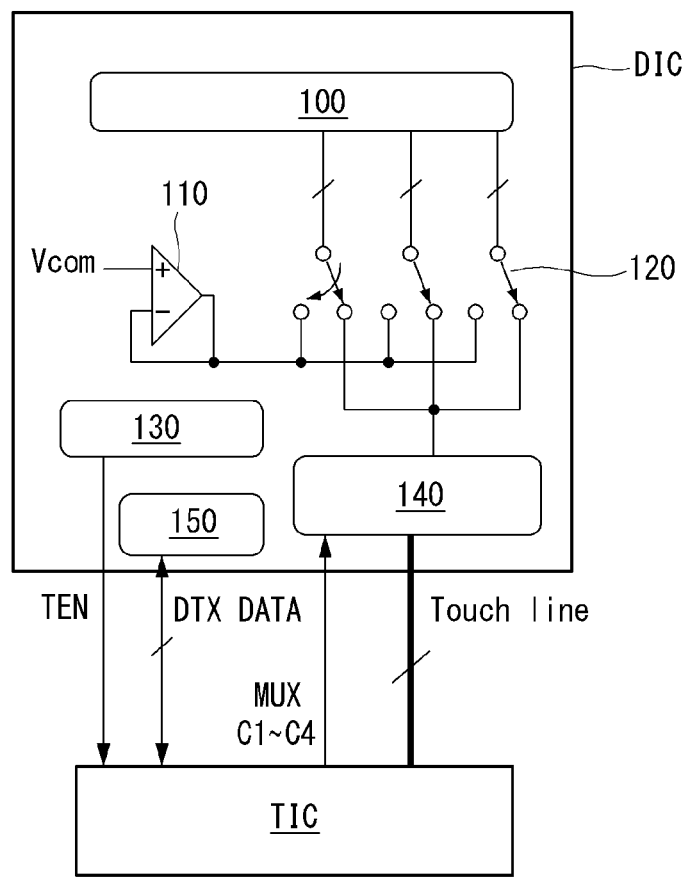
FIGS. 12 to 14 illustrate various examples of implementation of a touch sensor driver according to the present invention.
Figure 13:
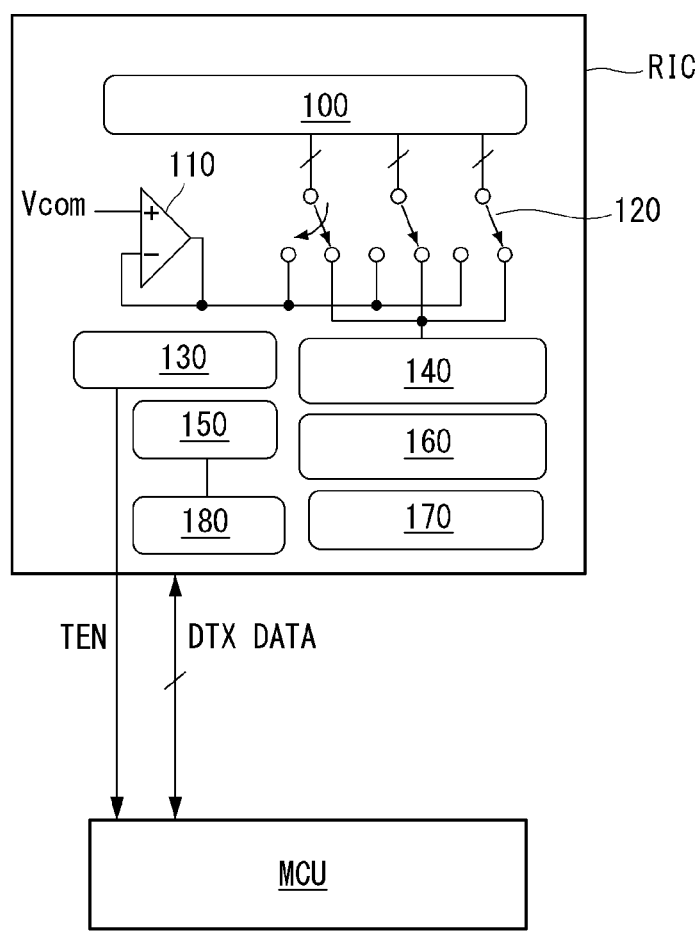
Figure 14:
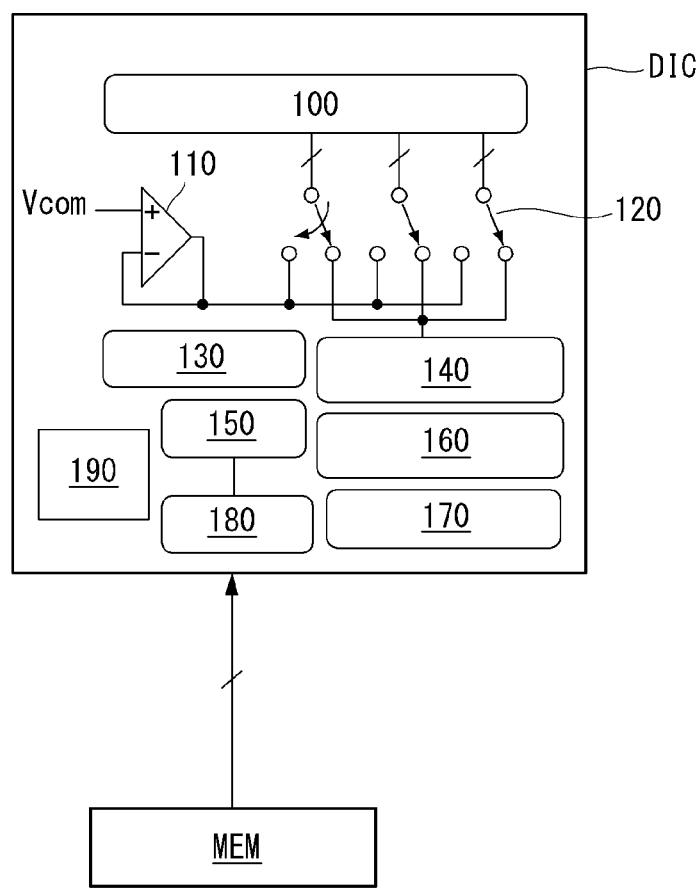

FIGS. 12 to 14 illustrate various examples of implementation of a touch sensor driver 20 according to the present invention.

The touch sensor driver 20 of this invention may be implemented as such an IC (integrated circuit) package as shown in FIGS. 12 to 14.

Referring to FIG. 12, the touch sensor driver 20 comprises a driver IC DIC and a touch sensing IC TIC.

The driver IC DIC comprises a touch sensor channel part 100, a Vcom buffer 110, a switch array 120, a timing control signal generator 130, a multiplexer (MUX) 140, and a DTX compensator 150.

The touch sensor channel part 100 is connected to touch sensor electrodes through sensor lines (not shown), and connected to the Vcom buffer 110 and the multiplexer 140 through the switch array 120. The multiplexer 140 connects the sensor lines to the touch sensing IC TIC. In the case of a 1:3 multiplexer, the multiplexer 140 reduces the number of channels of the touch sensing IC TIC by sequentially connecting one channel of the touch sensing IC TIC to three sensor lines by time-division multiplexing. The multiplexer 140 sequentially selects sensor lines to be connected to a channel of the touch sensing IC TIC in response to MUX control signals MUX C1 to C4. The multiplexer 140 is connected to the channels of the touch sensing IC TIC through touch lines.

The Vcom buffer 110 outputs a common voltage Vcom for the pixels. The switch array 120 supplies the common voltage Vcom from the Vcom buffer 110 to the touch sensor channel part 100 during a display period under control of the timing control signal generator 130. The switch array 120 connects the sensor lines to the touch sensing IC TIC during a touch period under control of the timing control signal generator 130.

The timing control signal generator 130 generates timing control signals for controlling the operation timings of a display driver and the touch sensing IC TIC. The display driver comprises a data driver 12 and gate driver 14 for writing data of an input image to the pixels.

Figure 3:
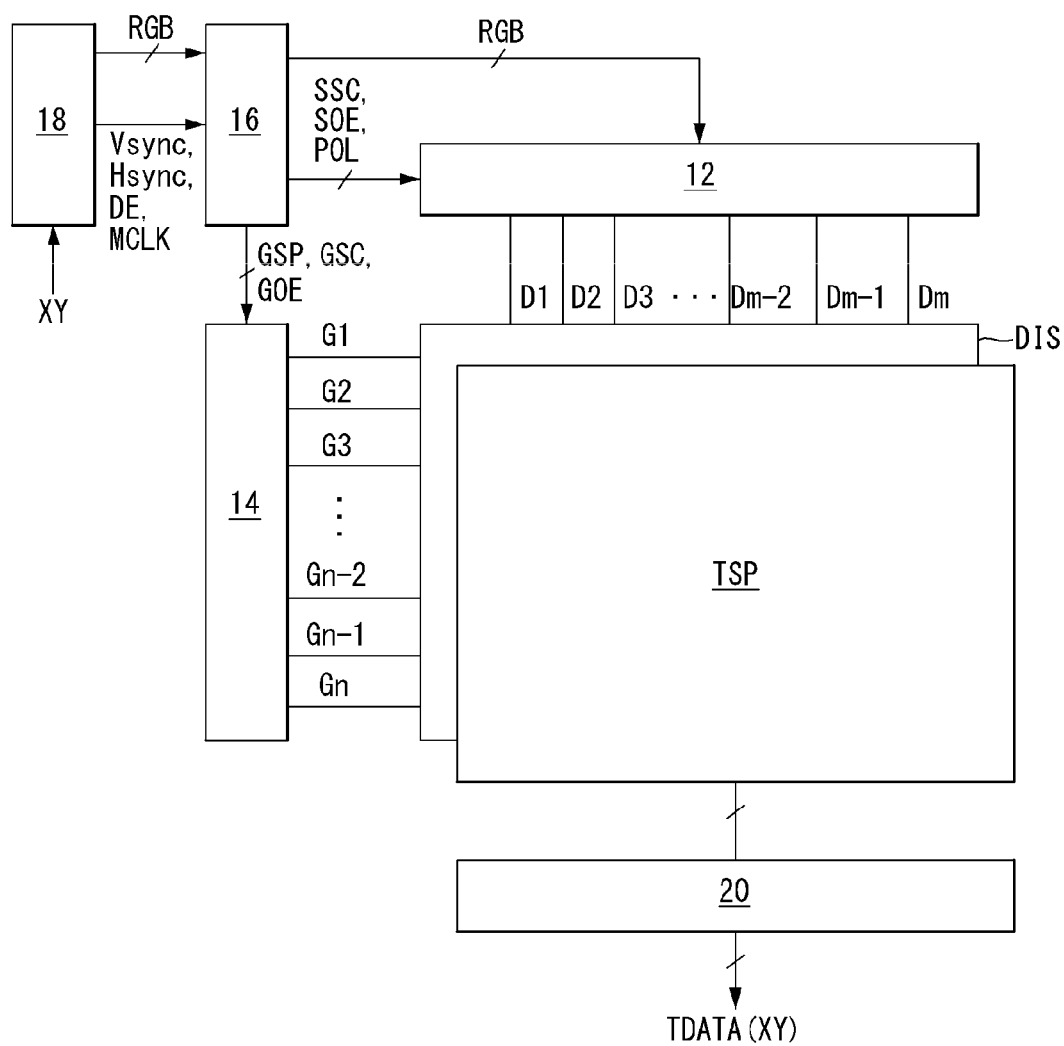
FIG. 3 is a block diagram showing a display device with a touch sensor driving device integrated therein according to one exemplary embodiment of the present invention.

The timing control signal generator 130 is substantially identical to the timing control signal generator within the timing controller 16 of FIG. 3. The timing control signal generator 130 drives the display driver during the display period and drives the touch sensing IC TIC during the touch period.

The timing control signal generator 130 generates a touch enable signal TEN for defining the display period and the touch period and synchronizes the display driver and the touch sensing IC TIC. The display driver writes data to the pixels during a first level period of the touch enable signal TEN. The touch sensing IC TIC senses touch input by driving touch sensors in response to a second voltage level of the touch enable signal TEN.

The touch sensing IC TIC is connected to a driving power supply (not shown) and supplied with driving power. The touch sensing IC TIC generates a touch sensor driving signal in response to the second level of the touch enable signal TEN and applies it to the touch sensors. While the touch sensor driving signal may be generated in various forms such as a square wave pulse, a sine wave, a triangular wave, etc., it is preferably a square wave. The touch sensor driving signal may be applied N times to the touch sensors so that charge is accumulated N times (N is a positive integer of 2 or more) in an integrator of the touch sensing IC TIC.

The amount of noise in a touch sensor signal may increase with changes in the input image data. The DTX compensator 150 analyzes the input image data, removes noise components from touch raw data according to changes in the gray scale of the input image, and transmits the resultant data to the touch sensing IC TIC. DTX stands for Display and Touch Crosstalk. The DTX compensator 150 is described in detail in Patent Application No. 10-2012-0149028 filed on Dec. 19, 2012 by the present inventor. In the case of a system in which touch sensor noise is not sensitive to changes in input image data, the DTX compensator 150 is not required and is therefore omitted. In FIG. 12, DTX DATA denotes output data of the DTX compensator 150.

The touch sensing IC TIC drives the multiplexer 150 during the touch period in response to a touch enable signal TEN from the timing control signal generator 130 and receives charge from the touch sensors through the multiplexer 140 and the sensor lines.

The touch sensing IC TIC detects a change in the amount of charge between before and after touch input based on a touch sensor signal, compares the change in the amount of charge with a predetermined threshold, and, if the change in the amount of charge is more than the threshold, determines that the positions of the touch sensors where the change in the amount of change has occurred are a touch input region. The touch sensing IC TIC calculates the coordinates of each touch input and transmits touch data TDATA(XY) containing touch input coordinate information to an external host system (not shown). The touch sensing IC TIC comprises an amplifier for amplifying the charge of the touch sensors, an integrator for accumulating the charge received from the touch sensors, an ADC (analog-to-digital converter) for converting the voltage from the integrator to digital data, and a logic operation part. The logic operation part executes a touch recognition algorithm for comparing touch raw data output from the ADC with a threshold, determining the presence or absence of touch input according to the result of the comparison, and calculating the coordinates.

The driver IC DIC and the touch sensing IC TIC may transmit and receive signals to and from the host system through an SPI (serial peripheral interface) interface or BLVDS (bus-low-voltage differential signaling) interface.

Referring to FIG. 13, the touch sensor driver 20 comprises a read-out IC RIC and an MCU (micro controller unit).

The read-out IC RIC comprises a touch sensor channel part 100, a Vcom buffer 110, a switch array 120, a first timing control signal generator 130, a multiplexer 140, a DTX compensator 150, a sensing part 160, a second timing control signal generator 170, and a memory 180. As compared with the foregoing exemplary embodiment illustrated in FIG. 12, the difference is that the sensing part 160 and the second timing control signal generator 170 are integrated in the read-out IC RIC. The first timing control signal generator 130 is substantially identical to that of FIG. 12. Accordingly, the first timing control signal generator 130 generates timing control signals for controlling the operation timings of the display driver and read-out IC RIC.

The multiplexer 140 causes touch sensor electrodes accessed by the sensing part 160 to float under control of the MCU. The touch sensor electrodes accessed by the sensing part 160 are selected by the sensing part 160 from among all the touch sensor electrodes, apart from those connected to pixels being charged with a data voltage. The multiplexer 140 may supply a common voltage Vcom under control of the MCU. The sensing part 160 is connected to the sensor lines through the multiplexer 140 and measures a change in the waveform of a voltage received from the touch sensors and converts it to digital data. The sensing part 160 comprises an amplifier for amplifying the voltage received from the touch sensor electrodes 12, an integrator for accumulating the voltage from the amplifier, and an analog-to-digital converter (hereinafter, 'ADC') for converting the voltage from the integrator to digital data. The digital data output from the ADC is transmitted as touch raw data to the MCU.

The second timing control signal generator 170 generates timing control signals, clocks, etc. for controlling the operation timings of the multiplexer 140 and sensing part 160. The DTX compensator 150 may be omitted in the read-out IC RIC. The memory 180 temporarily stores the touch raw data under control of the second timing control signal generator 170.

The read-out IC RIC and the MCU may transmit and receive signals through an SPI (Serial Peripheral Interface) interface or BLVDS (Bus-Low-Voltage Differential Signaling) interface. The MCU executes a touch recognition algorithm for comparing touch raw data with a threshold, determining the presence or absence of touch input according to the result of the comparison, and calculating the coordinates.

Referring to FIG. 14, the touch sensor driver 20 comprises a driver IC DIC and a memory MEM.

The driver IC DIC comprises a touch sensor channel part 100, a Vcom buffer 110, a switch array 120, a first timing control signal generator 130, a multiplexer 140, a DTX compensator 150, a sensing part 160, a second timing control signal generator 170, a memory 180, and an MCU 190. The difference between this exemplary embodiment and the previous exemplary embodiment illustrated in FIG. 13 is that the MCU 190 is integrated within the driver IC DIC. The MCU 18 executes a touch recognition algorithm for comparing touch raw data with a threshold, determining the presence or absence of touch input according to the result of the comparison, and calculating the coordinates.

The memory MEM stores register settings about timing information required for the operations of the display driver and sensing part 160. The register settings are loaded to the first timing control signal generator 130 and the second timing control signal generator 170 from the memory MEM when the display device is powered on. The first timing control signal generator 160 and the second timing control signal generator 170 generate timing control signals for controlling the display driver and sensing part 160 based on the register settings read from the memory MEM. The register settings in the memory MEM may be changed to deal with a model change, without any structural change of the display device.

As explained above, the present invention prevents the output voltage of the touch sensing circuits from exceeding a predetermined permissible range and becoming saturated by reducing the amount of change in a touch sensor sensing signal by means of discharge circuits connected between receiving channels and the touch sensing circuits.

In the present invention, the size and manufacturing cost of a touch sensor driver can be reduced by including a discharge circuit comprising two switches and a plurality of charge eliminating capacitors and reducing the voltage swing amplitude of a charge eliminating pulse signal and the capacitance of the charge eliminating capacitors.

Moreover, in the present invention, the swing amplitude of touch sensor sensing signals can be finely adjusted by including a discharge circuit comprising two or more charge eliminating capacitors and varying the voltage swing amplitude of a charge eliminating pulse signal and the capacitance of the charge eliminating capacitors.

From the above description, those skilled in the art to which the present invention pertains will appreciate that various changes and modifications are possible without departing from the technical spirit of the present invention. Accordingly, the technical scope of this invention is not limited to what is described above, but rather defined by the appended claims.

What is claimed is:

1. A touch sensitive display device comprising:
   at least one electrode;
   a touch sensor circuit comprising a first input terminal coupled to the at least one electrode; and
   a discharge circuit to discharge the first input terminal of the touch sensor circuit, the discharge circuit selectively connecting the first input terminal to a discharge path a plurality of times at predetermined intervals during a touch driving pulse of a touch sensing driving signal provided to the at least one electrode.

2. The touch sensitive display device of claim 1, wherein the predetermined intervals are periodic intervals.

3. The touch sensitive display device of claim 1, wherein time periods during which the first input terminal is selectively connected to the discharge path is adjustable.

4. The touch sensitive display device of claim 1, wherein the discharge path of the discharge circuit comprises a node and a plurality of charge eliminating capacitors coupled to the node.

5. The touch sensitive display device of claim 4, wherein electrodes at one side of the charge eliminating capacitors are connected commonly to the node, and electrodes at another side of the charge eliminating capacitors are connected to respective charge eliminating pulse signals, each charge eliminating pulse signal having a plurality of pulses during the touch driving pulse of the touch driving signal.

6. The touch sensitive display device of claim 5, wherein falling edges of the charge eliminating pulse signals occur while the first input terminal is connected to the discharge path.

7. The touch sensitive display device of claim 5, wherein the charge eliminating pulse signals comprise a first charge eliminating pulse signal and a second charge eliminating pulse signal having a same phase as the first charge eliminating pulse signal.

8. The touch sensor driving device of claim 5, wherein the at least one electrode is implemented as a mutual capacitance sensor, and the pulses have opposite polarity from the touch driving pulse.

9. The touch sensor driving device of claim 5, wherein the at least one electrode is implemented as a self capacitance sensor, and the pulses have same polarity as the touch driving pulse.

10. The touch sensitive display device of claim 4, wherein the discharging circuit comprises a first switch to selectively connect the first input terminal to the node the plurality of times.

11. The touch sensitive display device of claim 10, wherein the touch sensor circuit further comprises a second input terminal, and the discharging circuit further comprises a second switch to selectively connect the second input terminal to the node a plurality of times during the touch driving pulse of the touch driving signal, the second switch switched at an opposite phase from the first switch.

12. The touch sensitive display device of claim 11, wherein the touch sensor circuit further comprises an op-amp, and the first input terminal is a negative input terminal of the op-amp and the second input terminal is a positive input terminal of the op-amp.

13. A driver circuit for a touch sensitive display device that comprises at least one electrode, the driver circuit comprising:
    a touch sensor circuit comprising a first input terminal for coupling to the at least one electrode; and
    a discharge circuit to discharge the first input terminal of the touch sensor circuit, the discharge circuit selectively connecting the first input terminal to a discharge path a plurality of times at predetermined intervals during a touch driving pulse of a touch sensing driving signal provided to the at least one electrode.

14. The driver circuit of claim 13, wherein the predetermined intervals are periodic intervals.

15. The driver circuit of claim 13, wherein time periods during which the first input terminal is selectively connected to the discharge path is adjustable.

16. The driver circuit of claim 13, wherein the discharge path of the discharge circuit comprises a node and a plurality of charge eliminating capacitors coupled to the node.

17. The driver circuit of claim 13, wherein electrodes at one side of the charge eliminating capacitors are connected commonly to the node, and electrodes at another side of the charge eliminating capacitors are connected to respective charge eliminating pulse signals, each charge eliminating pulse signal having a plurality of pulses during the touch driving pulse of the touch driving signal.

18. The driver circuit of claim 17, wherein falling edges of the charge eliminating pulse signals occur while the first input terminal is connected to the discharge path.

19. The driver circuit of claim 17, wherein the charge eliminating pulse signals comprise a first charge eliminating pulse signal and a second charge eliminating pulse signal having a same phase as the first charge eliminating pulse signal.

20. The driver circuit of claim 17, wherein the at least one electrode is implemented as a mutual capacitance sensor, and the pulses have different polarity from the touch driving pulse.

21. The driver circuit of claim 17, wherein the at least one electrode is implemented as a self capacitance sensor, and the pulses have same polarity as the touch driving pulse.

22. The driver circuit of claim 16, wherein the discharging circuit comprises a first switch to selectively connect the first input terminal to the node the plurality of times.

23. The driver circuit of claim 22, wherein the touch sensor circuit further comprises a second input terminal, and the discharging circuit further comprises a second switch to selectively connect the second input terminal to the node a plurality of times during the touch driving pulse of the touch driving signal, the second switch switched at an opposite phase from the first switch.

24. The driver circuit of claim 23, wherein the touch sensor circuit further comprises an op-amp, and the first input terminal is a negative input terminal of the op-amp and the second input terminal is a positive input terminal of the op-amp.

25. A method for operating a touch sensitive display device that comprises a display panel including at least one electrode and touch sensor circuit having an input terminal coupled to the least one electrode, the method comprising:
  driving a touch sensing driving signal to the at least one electrode, the touch sensing driving signal having a touch driving pulse;
  discharging the first input terminal of the touch sensor circuit by selectively connecting the first input terminal to a discharge path a plurality of times at predetermined intervals during the touch driving pulse of the touch sensing driving signal.

26. The method of claim 25, wherein discharging the first input terminal further comprises providing a plurality of charge eliminating pulse signals to the discharge path each charge eliminating pulse signal having a plurality of pulses during the touch driving pulse of the touch driving signal.

27. The method of claim 25, wherein falling edges of the charge eliminating pulse signals occur while the first input terminal is connected to the discharge path.

28. The method of claim 25, wherein the charge eliminating pulse signals comprise a first charge eliminating pulse signal and a second charge eliminating pulse signal having a same phase as the first charge eliminating pulse signal.

29. The method of claim 25, wherein selectively connecting the first input terminal to a discharge path a plurality of times comprises selectively connecting the first input terminal to a node of the discharge path, and further comprising:
  selectively connecting a second input terminal of the touch sensor circuit to the node a plurality of times during the touch driving pulse of the touch driving signal, the first input terminal being selectively connected at an opposite phase from the second input terminal.

* * * * *